United States Patent [19]
Stanley

[11] Patent Number: 5,595,534
[45] Date of Patent: Jan. 21, 1997

[54] EASILY REMOVABLE ADJUSTABLE SIZING DEVICE FOR TUBULAR FOOD CASING

[75] Inventor: Thomas R. Stanley, Georgetown, Ill.

[73] Assignee: Devro-Teepak, Inc., Westchester, Ill.

[21] Appl. No.: 593,982

[22] Filed: Jan. 30, 1996

[51] Int. Cl.$^6$ .................................................. A22C 11/02
[52] U.S. Cl. .................................................. 452/38
[58] Field of Search ........................................ 452/38, 37

[56] References Cited

U.S. PATENT DOCUMENTS

| | | |
|---|---|---|
| 3,457,588 | 7/1969 | Myles et al. . |
| 3,553,769 | 1/1971 | Myles et al. . |
| 4,034,441 | 7/1977 | Kupcikevicius et al. ............... 452/38 |
| 4,077,090 | 3/1978 | Frey et al. . |
| 4,164,057 | 8/1979 | Frey et al. . |
| 4,202,075 | 5/1980 | Michel et al. . |
| 4,505,003 | 3/1985 | Becker et al. ........................... 452/38 |
| 4,512,059 | 4/1985 | Beckman . |
| 4,528,719 | 7/1985 | Frey . |
| 4,535,508 | 8/1985 | Aceto . |
| 4,599,764 | 7/1986 | Knepshield ............................ 452/38 |
| 4,727,624 | 3/1988 | Stanley . |
| 4,809,403 | 3/1989 | Stanley .................................. 452/38 |
| 4,951,715 | 8/1990 | Beckman et al. ..................... 452/38 |
| 4,958,411 | 9/1990 | Stanley .................................. 452/38 |
| 5,211,599 | 5/1993 | Stanley .................................. 452/37 |

*Primary Examiner*—Willis Little
*Attorney, Agent, or Firm*—Michael L. Dunn

[57] ABSTRACT

A snap-on adjustable one piece sizing ring comprising an inner horn ring and an outer horn ring. The inner horn ring comprises an inner horn ring elliptical plate to which is attached a tubular section about an off-center hole therethrough. The outer horn ring comprises an outer horn ring elliptical plate having an off-center hole which fits over and is free to rotate about the tubular section so that overall circumference of the combined plates can be varied. The tubular section of the inner horn ring is provided with means for releasable attachment to an inner tube of a two-part stuffing horn comprising concentric inner and outer tubes. The outer horn ring is provided with means for releasable attachment to the outer tube of the two-part stuffing horn so that rotation of the concentric tubes relative to each other causes rotation of the elliptical plates relative to each other so that the overall circumference of the sizing ring is varied. The elliptical plates may be circular.

7 Claims, 3 Drawing Sheets

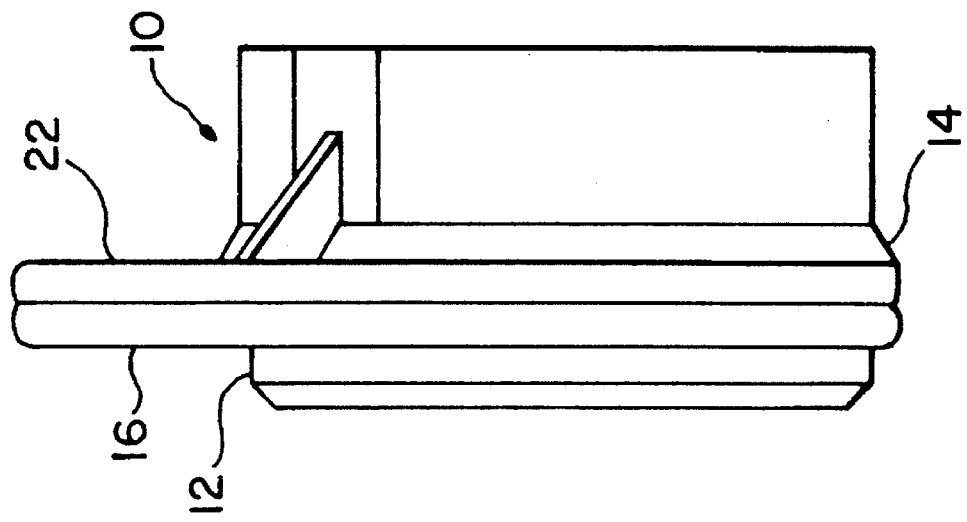

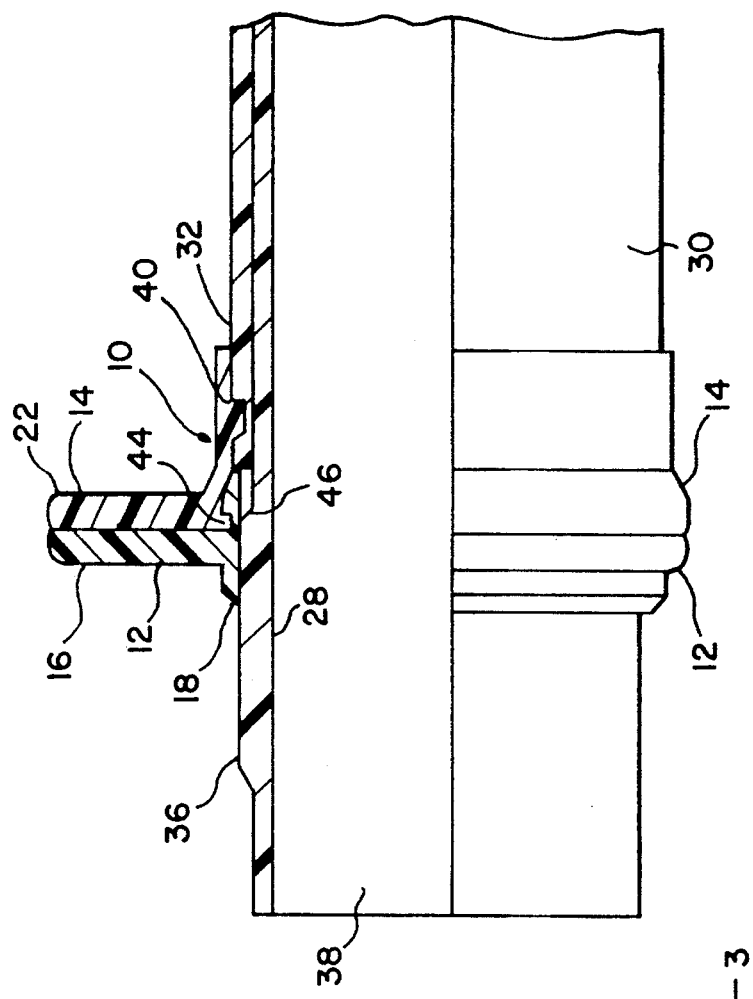
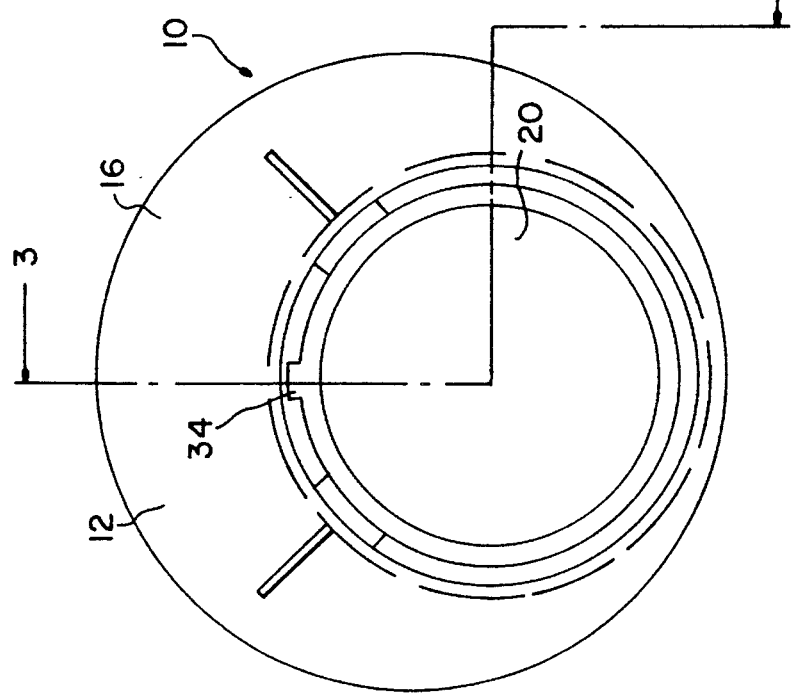

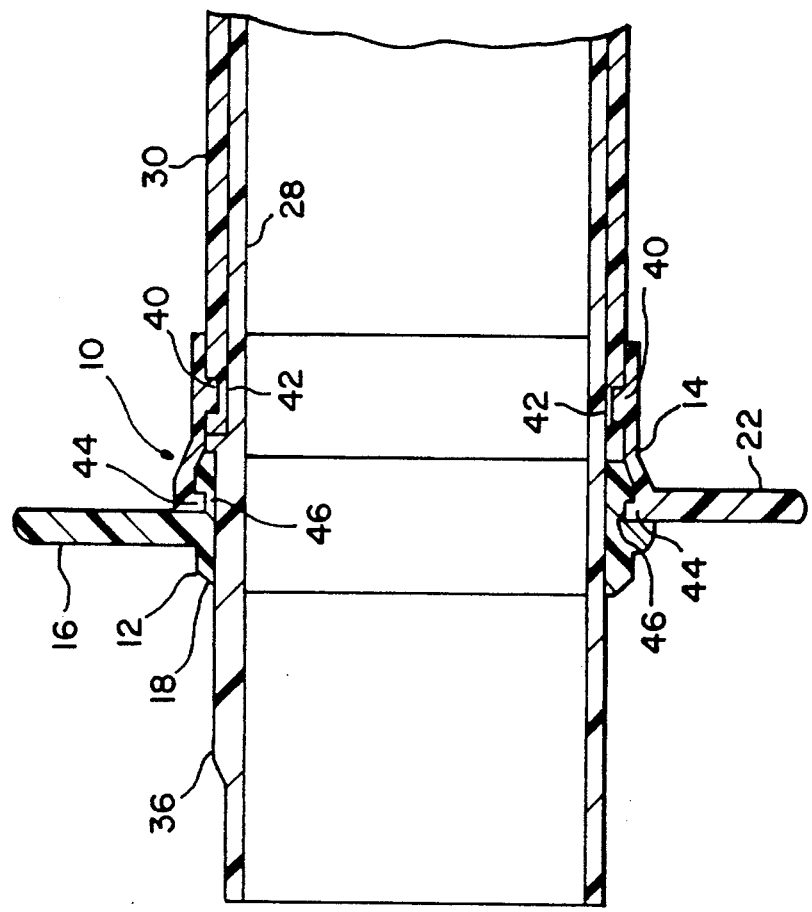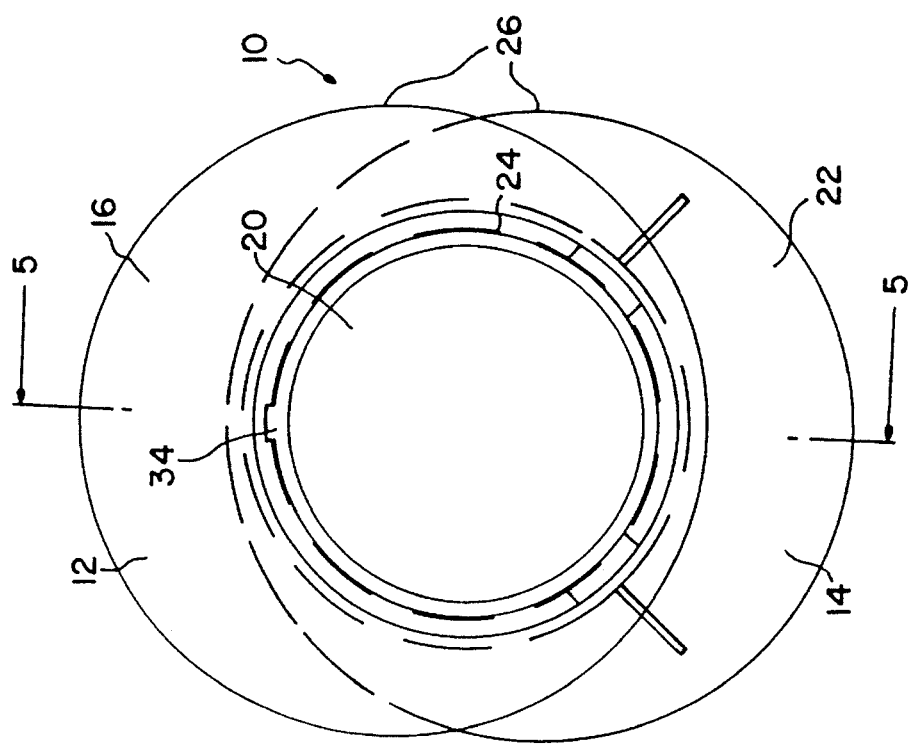

5,595,534

EASILY REMOVABLE ADJUSTABLE SIZING DEVICE FOR TUBULAR FOOD CASING

FIELD OF THE INVENTION

The present invention relates generally to the field of producing encased food products and more specifically to the production of consistent dimensions and density within such products as they are encased through the use of sizing rings.

BACKGROUND OF THE INVENTION

In the food packaging industry, products such as sausage, frankfurters, various cheeses, processed hams, bologna, etc., are produced and packaged in casings. The casing materials are either natural or synthetic and are variously edible and nonedible. Shirred casing sticks are often used in the stuffing of food emulsion products, the casing material being in tubular form. A casing stick is produced from axially compressing a length of tubular casing material such that accordion-like pleats are formed, substantially decreasing the length of the tubular casing material from extended lengths of 70 to 100 feet or more to compressed lengths which may be only as long as 10 to 20 inches.

When shirred casing is used, the shirred casing stick is axially telescoped onto a stuffing horn which then extends through the bore of the casing stick.

Stuffed food casing products made from shirred casing sticks range in diameter size from rather small, such as, for example, Vienna sausage, up to relatively large sizes such as, for example, bologna. Regardless of the diameter size of the end product, the method of stuffing the food emulsion into the casing is predominantly the same: the stuffed food emulsion is pumped through a stuffing horn into a tubular casing which is paid out from a shirred stick which has been fitted over the stuffing horn. (In some situations, non-shirred casings are used to produce larger diameter products.) The pressure and force exerted by the moving food emulsion extrusion pulls the casing, into which the food emulsion is being stuffed, along with it, thus packaging the product. Various means, well known to those with skill in the art, are employed to form the encased food product into links, as might be found in frankfurters, or into chubs which is a term applied to lengths of bologna. Various means are used to separate and cut off the lengths or chubs.

Large sausage products are predominantly used in producing sliced products for sale to the public. Much of this sliced product business today is based on selling prepackaged quantities wherein the sliced pieces must have consistent texture, density and size to enhance customer appeal and also so the packaged product, package by package, is consistent in weight. It is very common to find sliced prepackaged products which have a consistent weight of, for example, 12 ounces. For smaller food emulsion products, such as frankfurters, there are normally a set number of pieces in a given weight package such as, for example, 10 frankfurters in a 16 ounce (one pound) package. Cheeses are normally sold in either presliced packages of consistent weight or in short cylindrical sections which consistently weigh, for example, one pound. To produce such products having consistent weight, the stuffing operation must be able to produce a product which has consistent density and a consistent cross sectional size. For sliced products, this insures that each slice will weigh the same as each other slice. For link products, each link would weigh the same as each other link. Thus the packaging of these products can be accomplished on automated high speed packaging equipment without the necessity to weigh and mark each separate package. In addition, sizing of the pieces to be prepackaged is important to ensure that they will fit uniformly into the packaging that was designed for them.

Over many years the industry has determined through experience (trial and error), the optimum stuffing and processing conditions for various types of food products, e.g., food emulsions. Such products generally are sought to be stuffed and encased to an ideal "green" or unprocessed diameter. When a casing is understuffed from the recommended green diameter, the resultant product is usually not uniform in diameter from end to end and from piece to piece. The product may have a wrinkled appearance caused by the casing not being fully expanded to the extent of its design. This, by itself, creates a product with diminished appeal to the customer. In addition, there is a tendency for such understuffed products to have what is known as "emulsion breakdown" resulting in the formation of pockets of fat or liquid which further degrade the product in respect to end use. Such an understuffed product, of course, cannot be used for prepackaging where consistent weight and sizing are critical.

On the other hand, when a casing is overstuffed beyond the recommended green diameter, the product may balloon, even if the elastic limits of the casing material are not exceeded. This is because the thickness and compositional consistency of the casing material varies to some degree, thus overstuffing may well cause bulges resulting in inconsistencies in the cross-sectional sizing of the food emulsion product, from end to end, over its length. As mentioned before, such can readily result in inconsistent piece or link weights for prepackaged products, and may cause difficulty in the actual packaging due to inconsistent size control.

When the elastic limit of the casing material is exceeded, the casing may split and break apart either at the stuffing station or subsequently, in transport, or in cooking, smoking or other processing operations. The result is wasted product and the complications, labor and expense which are necessary for the clean-up.

Many devices and systems have been proposed and are well known to those with skill in the art for controlling the pay out of tubular casing material from the shirred casing stick on the stuffing horn. These generally fall into two categories. The first of these categories is referred to as a brake. A brake system usually acts to apply circumferential pressure or force onto the outside of the casing material at a point which is adjacent to the end of the stuffing horn. Thus, the casing material must traverse a small space between the outside diameter of the stuffing horn and the inside diameter of the brake. The function of a brake is to provide an interference fit between the brake and the stuffing horn such that a desired degree of force is required to pull the casing material through the small space. Some variation in the sizing of this small space can be applied by increasing or decreasing the pressure imposed by the brake means. For example, the brake means may be a resilient ring made of some sort of synthetic elastomer with its inside diameter axially being smaller than the outside diameter of the stuffing horn. With such a device, typically the brake ring is forced over the end of the stuffing horn, expanding the elastic brake ring such that consistent pressure is placed circumferentially onto the outside diameter of the tubular casing material. This pressure results in friction between the outside surface of the casing material and the brake ring as well as the inside surface of the casing material and the stuffing horn.

Sizing devices, on the other hand, take the form of discs or rings, of a given set size, which are placed over the stuffing horn adjacent to its outlet end, being arranged such that the casing material must traverse over the sizing device. The principle of operation is that the sizing device is set and designed to expand the casing material, and in some cases, slightly stretch it to its ultimate diameter, as the casing material traverses over the sizing device. Sizing devices tend to take out substantially all of the folds, pleats and wrinkles in the casing material and, further, to impose a frictional contact to the moving casing material as it passes over the sizing device. Thus, a given amount of pressure and force is required to pull the casing material over the sizing device. The pulling force and pressure, which move the casing material over the sizing device, are supplied by the moving food emulsion being extruded and stuffed into the casing.

In many cases, combinations of brake systems and sizing devices are used, the arrangement typically being that the casing material first is pulled over the sizing device and then through the small space between the brake means and the stuffing horn. Such combined arrangements are said to provide the ultimate degree of control over the pay out of the casing material as it moves from the shirred casing stick to the output end of the stuffing horn where the extruding food product actually enters the casing.

A problem with all such sizing devices is that they are larger than the inside diameter of a shirred casing and thus must be placed upon a stuffing horn after a stick of food casing.

Also because there are variations in casing wall thickness and compositional consistency, as well as variations in the consistency and density of the food emulsion as it exits the output end of the stuffing horn, it is desirable to provide as much control as possible to the flow of casing material being paid out from the shirred casing stick. It is known in the industry that, in respect to a given size of casing, increasing the diameter of the sizing disc increases the casing hold back by way of increasing the force required to overcome the friction between the sizing disc and the inside wall of the casing. However, this approach has its limitations in that care must be taken not to force the size of the casing material beyond its elastic limits or to provide too much frictional contact such that the extruding food emulsion overstuffs the casing, causing the problems discussed above. On the other hand, undersizing the sizing disc can result in the production of understuffed green product and the problems, likewise, discussed above.

No easily removable means are known or available by which the sizing devices can be effectively adjusted after the stuffing operation commences. Unfortunately, the above-discussed variations and inconsistencies do not become readily apparent until the stuffing operation is commenced, and the only way, at that point, of compensating for such variations and inconsistencies is by halting the stuffing operation to make adjustments. This necessitates disassembly of the system as the shirred casing stick needs to be removed from the stuffing horn, either to make adjustments to the sizing device or to install a different size of sizing device. In the high-speed automated operations used at present in the food stuffing industry, not only is such a requirement undesirable and impractical, but it also is considered intolerable. As a result, much attention has been focused on improving the consistency and wall thickness of the casing material as well as on improving the consistency and density of the food emulsion as extruded. Although significant strides have been made in improving these areas, the variables and inconsistencies still exist and are still a notable factor inhibiting optimization of the production of encased food emulsion products.

U.S. Pat. No. 5,211,599, incorporated herein by reference, teaches a sizing ring having a diameter which may be adjusted during stuffing operation but the ring does not permit easy removal for reloading of a shirred strand onto the stuffing horn. In fact, a set screw 49 must be removed each time that the ring is removed. Furthermore, the adjustment does not permit loading of shirred casing properly sized for the stuffing horn without such removal.

U.S. Pat. Nos. 3,457,588 and 3,553,769 teach the use of an unusually complicated and cumbersome adjustable sizing device with several, typically four, sizing elements which can be radially expanded outwardly from the stuffing horn by simultaneously turning elongated shafts. The elongated shafts are extended parallel to the axis of the stuffing horn to about the point where the stuffing horn is connected to the food emulsion pump. The elongated shafts are rotated simultaneously through a system of toggle links driven by a means for producing linear motion, i.e., a machine screw.

U.S. Pat. No. 4,202,075 also teaches means for adjusting the size of a sizing device. The sizing device taught by this reference is formed from a tubular mechanism with an enlarged end which radially engages the internal surfaces of the casing being drawn across it. The mechanism disclosed by U.S. Pat. No. 4,202,075 does not provide any means for adjustment of the sizing device during the stuffing of the casing, but rather, only when the casing material is stationary.

U.S. Pat. No. 4,535,508 teaches the use of an expandable casing sizing mechanism with sizing members which are radially expandable in contact with the internal casing surfaces. However, like the device shown in U.S. Pat. No. 4,202,075, the apparatus of U.S. Pat. No. 4,535,508 is not adjustable during the casing stuffing operation when the casing material is moving.

U.S. Pat. No. 4,512,059 discloses a rigid petal-like sizing member, including means for applying force for outwardly expanding the device against the inner surface of the casing. In this device, the force for expanding the petals of the sizing member is provided by the movement of the casing itself, but is not adjustable to vary the amount of force being applied to the moving casing material.

U.S. Pat. No. 4,528,719 discloses a sizing ring comprising two pieces. The two pieces are compressed together, one element inside the other, to expand the device against the interior of the moving casing material, but not while the casing material is moving.

U.S. Pat. Nos. 4,077,090 and 4,164,057 both disclose a combination sizing device and brake ring assembly. The sizing device is mounted on a slidable sleeve, fitted onto and over the stuffing horn. The sleeve is moved reciprocally along the longitudinal axis of the stuffing horn. Longitudinal movement of the sleeve causes the sizing device to engage the inside wall of the casing and push it against a stationary brake ring, thus applying adjustable frictional force to both the inside and outside walls of the casing material before it comes into contact with the stuffing horn. Following this, the flow of casing material is redirected against the stuffing horn and through a more or less conventional brake ring. In these two patents, however, there is no means included for adjusting the sizing or braking forces during the stuffing of the casing.

U.S. Pat. No. 4,727,624 teaches a single piece sizing device of resilient material which can be expanded and contracted radially, adjusting the pressure imposed on the inside surface of the casing material. Unlike many of the previous sizing devices, the apparatus of U.S. Pat. No. 4,727,624 may be adjusted during the stuffing of the casing by longitudinal movement of a pipe which is fitted over the stuffing horn, the pipe being extended toward the food emulsion pump to the input end of the stuffing horn and beyond the remote end of the shirred casing stick which is fitted over the pipe. Longitudinal motion of the pipe imposes pressure onto the one piece sizing device which, in turn, expands radially to increase the pressure on the inside surface of the casing material. This causes hold back and expansion of the casing material simultaneously. However, the adjustment can only be accomplished if the food emulsion extrusion is halted, and thus this sizing device is not designed for adjustment while the casing material is moving.

BRIEF DESCRIPTION OF THE DRAWINGS

FIG. 1 shows a side view of the snap-on sizing ring of the invention.

FIG. 2 is a front view of the snap-on sizing ring of the invention placed upon concentric tubes.

FIG. 3 is a side view of the sizing ring of the invention placed upon concentric tubes taken on lines 3—3 of FIG. 2.

FIG. 4 is a front view of the expanded sizing ring of the invention on concentric tubes.

FIG. 5 is a cross-sectional side view taken on lines 5—5 of FIG. 4.

BRIEF DESCRIPTION OF THE INVENTION

Since none of the foregoing patents describe or disclose an uncomplicated or noncumbersome sizing mechanism which is both easily removable to permit reloading of shirred casing and adjustable during the stuffing operation, it is an object of the present invention to provide such a mechanism. In addition, since none of the foregoing devices are easily removable and readily adaptable to the automated, on-site casing shirring mechanisms with automated food emulsion stuffing systems, which are becoming increasingly and prominently used in the food emulsion stuffing industry, it is an object of the present invention to provide such a sizing device. Such devices usually require casing material which has been previously shirred into casing sticks at a separate location. Accordingly, means are needed which can easily use shirred sticks and can provide sizing of the casing material as it is paid out from the stuffing horn, to both size the casing material by expanding and smoothing it from its shirred state and to provide hold back to insure correct sizing of the stuffed food emulsion product as explained previously. In accordance with the present invention, such a sizing means should be adjustable during stuffing operations to compensate for the variations in both the food emulsion being extruded and in the casing material, and should be adjustable to provide casing material expansion where desired and should be easily removable to permit the fitting of a shirred casing stick upon the stuffing horn.

In accordance with the invention, there is provided a snap-on adjustable one piece sizing ring comprising an inner horn ring and an outer horn ring. The inner horn ring comprises an inner horn ring elliptical plate to which is attached a tubular section about an off-center hole therethrough. The outer horn ring comprises an outer horn ring elliptical plate having an off-center hole which fits over and is free to rotate about the tubular section so that overall circumference of the combined plates can be varied. The tubular section of the inner horn ring is provided with means for releasable attachment to an inner tube of a two-part stuffing horn comprising concentric inner and outer tubes. The outer horn ring is provided with means for releasable attachment to the outer tube of the two-part stuffing horn so that rotation of the concentric tubes relative to each other causes rotation of the elliptical plates relative to each other so that the overall circumference of the sizing ring is varied. The elliptical plates may be circular.

In a preferred embodiment of the releasable attachment for the outer horn ring, the outer horn ring is provided with at least one tab which locks into a mating slot in the outer tube, and outer horn ring is readily removable by lifting the tab from the slot. A plurality of such tabs may be provided which lock into a plurality of corresponding mating slots in the outer tube.

In a preferred embodiment of the releasable attachment for the inner horn ring, the inner horn ring may be provided with at least one notch for mating with an integral spline on the inner tube so that the inner horn ring is readily removable by sliding the inner horn ring from the inner tube.

To form the integral sizing ring structure, the outer horn ring is snapped over protrusions on the tubular section of the inner horn ring to form a single sizing ring unit.

The variation in circumference of the sizing ring may be accomplished manually by turning the inner and outer tubular sections relative to each other or may be accomplished, at the other extreme, by a fully automated and computerized detection and closed loop feedback system adapted to operate mechanized means for adjustment of the sizing means by turning the concentric tubes relative to each other.

It is to be understood that any degree, style, type or design of automation and/or mechanization to such adjustment means, within the understanding of those with skill in the art, are included within the scope of the present invention. The adjustment means of the present invention is preferably adapted to permit the use of different codes or sizes of casing without change of the sizing means provided the internal bore of the unshirred casing material is sufficiently large enough to permit the sheathing or telescoping of that material over the sizing means. The present invention is readily adapted to be applied to the production of a full range of sizes of stuffed and encased food emulsion products, for example, a range of products from the smallest being, e.g., Vienna sausage and the like, to the largest being, e.g., bologna and similar sized products. The present invention is also adapted to be used with a full range of casing materials including those which are natural and those which are synthetic, those which are edible and those which are nonedible. The present invention may be readily used with unshirred casing materials without adaptation, and it could be adapted to be used with pre-shirred casing sticks.

DETAILED DESCRIPTION OF THE INVENTION

"Snap-on" as used herein means that the inner horn ring quickly and easily attaches to the inner tube and the outer horn ring quickly and easily attaches to the outer tube.

Such attachment in both cases is by any suitable rapid attachment means whether or not there is an actual "snap" upon placement of the sizing ring upon the stuffing horn. Such attachment means is usually a pressure release attachment, i.e., application of pressure applies the horn ring or releases it. Examples of suitable attachment means include splines and grooves, retention pins through matching holes in the respective ring and tube, and tab locks where a tab on one of the rings or tubes enters a mating hole in the corresponding ring or tube. Attachment means which would not be within the invention are those which are not "quick" e.g., over a minute, to attach or remove. Such unsuitable attachment means, for example, include threaded bolts or set screws.

"One piece" as used herein means that the inner and outer horn rings are assembled to each other to form one piece.

The improved stuffing apparatus sizing ring may incorporate novel sizing heads in the form of elliptical plates which can be circular in shape and eccentrically mounted in a plane which is transverse to the longitudinal axis of the food casing stuffing horn. Alternatively, the invention contemplates sizing heads for engaging and expanding tubular food casing on the stuffing horn which are generally oblong in shape.

Referring now to the drawings, FIGS. 1–5 show a sizing ring 10 comprising an inner horn ring 12 and an outer horn ring 14. Inner horn ring 12 comprises inner horn ring elliptical plate 16 to which is attached a tubular section 18 about an off-center hole 20 therethrough. The outer horn ring 14 comprises an outer horn ring elliptical plate 22 having an off-center hole 24 which fits over and is free to rotate about tubular section 18 so that the overall circumference 26 of the combined plates can be varied. The tubular section 18 of inner horn ring 12 is provided with means for pressure release attachment to an inner tube 28 of a two-part stuffing horn 30. The two-part stuffing horn 30 includes inner tube 28 and outer tube 32. In the preferred embodiment shown in the drawings, the means for attachment of inner horn ring 12 is a notch 34 in inner horn ring 12 for mating with an integral spline 36 on inner tube 28 such that the inner horn 12 ring may be removed from inner tube 28 simply by application of pressure toward open end 38 of stuffing horn 30.

Outer horn ring 14 is provided with means for pressure release attachment to outer tube 32 of stuffing horn 30. In the preferred embodiment shown in the drawings, outer horn ring 14 is provided with a plurality of tabs 40 which lock into mating slots 42 in outer tube 32. The outer horn ring 14 is thus readily removable by lifting tabs 40 from slots 42.

To form an integral two-part sizing ring 10, outer horn ring protrusions 44 are snapped over inner horn ring depressions 46 to form the single sizing ring unit which permits the inner and outer horn rings to rotate with respect to each other. The attachment of inner horn ring 12 to inner tube 28 and the attachment of outer horn ring 14 to outer tube 30 permits inner horn ring 12 and outer horn ring 14 to rotate with respect to each other when tubes 28 and 30 are rotated with respect to each other thus varying the combined circumference 26 of elliptical plates 16 and 22.

Although the preferred and alternate embodiments of the present invention have been described in considerable detail, it will be apparent to those skilled in the art that those preferred and alternate embodiments of the present invention are capable of numerous modifications, variations and combinations without departing from the concepts, spirit and scope of the present invention as defined by the appended claims which are hereby specifically included, by this reference, in the foregoing specification.

What is claimed is:

1. A snap-on adjustable one piece sizing ring comprising an inner horn ring and an outer horn ring, the inner horn ring comprising an inner horn ring elliptical plate to which is attached a tubular section about an off-center hole therethrough, the outer horn ring comprising an outer horn ring elliptical plate having an off-center hole which fits over and is free to rotate about the tubular section so that overall circumference of the combined plates can be varied, the tubular section of said inner horn ring being provided with means for pressure release attachment to an inner tube of a two-part stuffing horn comprising concentric inner and outer tubes and the outer horn ring being provided with means for releasable attachment to the outer tube of said two-part stuffing horn so that rotation of the concentric tubes relative to each other causes rotation of the elliptical plates relative to each other so that said overall circumference is varied.

2. The sizing ring of claim 1 wherein the elliptical rings are circular rings.

3. The sizing ring of claim 1 wherein the outer horn ring is provided with a tab which locks into a mating slot in the outer tube, said outer horn ring being readily removable by lifting said tab from said slot.

4. The sizing ring of claim 3 wherein a plurality of tabs are provided which lock into a plurality of mating slots in the outer tube.

5. The sizing ring of claim 1 wherein the inner horn ring is provided with at least one notch for mating with an integral spline on the inner tube, said inner horn ring being readily removable by sliding the inner horn ring from said inner tube.

6. The sizing ring of claim 3 wherein the inner horn ring is provided with at least one notch for mating with an integral spline on the inner tube, said inner horn ring being readily removable by sliding the inner horn ring from said inner tube.

7. The sizing ring of claim 1 wherein the outer horn ring is snapped over protrusions on the tubular section of the inner horn ring to form a single sizing ring unit.

* * * * *